(12) United States Patent
Jankowski et al.

(10) Patent No.: US 11,787,481 B2
(45) Date of Patent: Oct. 17, 2023

(54) OVERLAY FLOOR FOR MOTOR VEHICLES

(71) Applicant: OKB SPOLKA Z OGRANICZONA ODPOWIEDZIALNOSCIA, Bukowiec (PL)

(72) Inventors: Marcin Piotr Jankowski, Bukowiec (PL); Damian Pawel Golinski, Lodz (PL)

(73) Assignee: OKB SPOLKA Z OGRANICZONA ODPOWIEDZIALNOSCIA, Bukowiec (PL)

( * ) Notice: Subject to any disclaimer, the term of this patent is extended or adjusted under 35 U.S.C. 154(b) by 82 days.

(21) Appl. No.: 17/568,556

(22) Filed: Jan. 4, 2022

(65) Prior Publication Data

US 2022/0219762 A1 Jul. 14, 2022

(30) Foreign Application Priority Data

Jan. 14, 2021 (PL) .......................... 436656

(51) Int. Cl.
*B62D 25/20* (2006.01)
(52) U.S. Cl.
CPC .................... *B62D 25/20* (2013.01)
(58) Field of Classification Search
CPC .. B62D 25/20; B62D 47/003; B62D 25/2054; B60R 13/011; B60R 2013/016; A61G 3/08; B60P 7/0815; B61D 1/04; B61D 17/10; B60N 2/01558
USPC ..................................... 296/184.1
See application file for complete search history.

(56) References Cited

U.S. PATENT DOCUMENTS

| 7,350,853 | B2* | 4/2008 | Fitze | B62D 29/005 |
| | | | | 410/104 |
| 2014/0145470 | A1* | 5/2014 | Preisler | B62D 29/04 |
| | | | | 52/309.1 |
| 2014/0374564 | A1* | 12/2014 | Schroeder | B60P 7/0815 |
| | | | | 248/503 |
| 2015/0266516 | A1* | 9/2015 | Williams | B62D 25/2072 |
| | | | | 296/184.1 |
| 2016/0152281 | A1* | 6/2016 | Hansen | B62D 25/2009 |
| | | | | 29/458 |

FOREIGN PATENT DOCUMENTS

| RU | 71 588 U1 | 3/2008 | |
| WO | 2015/078288 A1 | 6/2015 | |
| WO | WO-2016034505 A1 * | 3/2016 | ............ B61D 17/10 |

* cited by examiner

*Primary Examiner* — Pinel E Romain
(74) *Attorney, Agent, or Firm* — MYERS WOLIN, LLC

(57) ABSTRACT

An overlay floor for motor vehicles, applied on the mother floor of the vehicle, intended to fix seats, wheelchairs or other equipment therein, having a shape adapted to the mother floor of the vehicle in which it is to be mounted. In the floor plate there are made longitudinal mounting sockets, into which two-part mounting rails are inserted. The mounting rails consist of an upper rail with flanges and a groove for equipment fasteners and a lower base connected to it. The mounting sockets are made in a uniform sheet of the floor plate as through, longitudinal holes for the profiles of the mounting rails. The upper rails have a longitudinal lock at the bottom for connection to the lower bases which have a corresponding longitudinal lock along the upper surfaces of the bases.

6 Claims, 1 Drawing Sheet

OVERLAY FLOOR FOR MOTOR VEHICLES

CROSS REFERENCE TO RELATED APPLICATIONS

This application claims the priority of Polish Application P.436656, filed Jan. 14, 2021, the content of which is hereby incorporated by reference.

FIELD OF THE INVENTION

The subject of the invention is an overlay floor for motor vehicles, applied on the mother floor of the vehicle, intended to fix seats, wheelchairs or other equipment therein.

BACKGROUND

From the description of the Polish utility model no. Ru71588, an overlay floor is known, which has longitudinal mounting sockets in which mounting rails with a shaped groove for connecting elements of the equipment are placed. The overlay floor plate is layered, the bottom layer of which is made of a load-bearing plate, the top layer is a decorative plate, and between the load-bearing plate and the decorative plate there is a filling layer. In the decorative plate and in the filling layer, longitudinal mounting sockets are made, in which the mounting rails are embedded, and the bottom of the mounting sockets is a load-bearing plate and the sides of the mounting rails closely adjoin the side walls of the mounting sockets. The mounting rails have longitudinal flanges protruding along their entire length beyond the outline of the mounting sockets, so that the mounting rails lie with the flanges on the upper surface of the decorative plate. There is a shaped groove with a cross-section in the form of an inverted T-letter between the flanges. The mounting rails are attached to the walls and bottoms of the mounting sockets with glue.

From the patent description WO20150078288, an overlay floor is known, in which the longitudinal mounting rails are support profiles with longitudinal flanges at the top and with a shaped groove for fixing equipment between the flanges. The profiles have wide bases at the bottom, the bottom surfaces of which are used to place the rails on the vehicle's mother floor, and layered (or monolithic) plates are placed on the top surfaces of the base profiles so that the edges of the plates are below the flanges in the recesses between the flanges and the base. The base profiles presented in the description are high, therefore, in order to eliminate the large deflection of the plate between adjacent rails, support rails are placed in the middle of the distance between the rails, parallel to the mounting rails.

SUMMARY

According to the invention, the mounting rails consist of two parts, an upper rail with flanges and a groove for fasteners of the equipment and a lower base connected to it. Mounting sockets are made in the floor plate as through, longitudinal holes for the profiles of the mounting rails. The profile width of the upper rails and the width of the lower base profile are such that they fit into the mounting sockets with a light interference. The width of the foot of the lower base is many times greater than the width of the mounting sockets.

The upper rails have a longitudinal lock at the bottom for connecting to the lower bases which have a corresponding longitudinal lock along the top surfaces of the lower bases.

The upper rails and the lower bases are connected to each other by screws where in the center of the upper rails there are bolt holes for screws and in the center of the profiles on the lower bases, there are threaded holes for the threads of the bolts connecting the two parts of the mounting rails at the locations corresponding to the holes in the upper rails.

The lock of the upper rails and the lock of the base are joined together by a layer of glue.

It is also possible for the upper rails and lower bases to be bolted together, with screw holes in the center of the upper rails, and in the center of the base profiles in the places corresponding to the holes in the upper rails, there are threaded holes for the screw threads connecting both parts of the mounting rails and the lock of the upper rails and the lock of the lower base are joined together by a layer of glue.

Preferably, the profiles of the upper rails are attached to the mounting sockets by a layer of glue and/or the profiles of the lower bases are attached to the mounting sockets by a layer of glue.

The overlay floor according to the invention is an independent part, it is adjusted to a given vehicle, it is self-supporting, it is a good thermal and sound barrier of the interior of the vehicle from the floor. It is possible to freely arrange the vehicle space—to install chairs, wheelchairs, loads. The floor improves the pressure distribution, distributing point loads over its entire surface, it is rigid, which also increases the stiffness of the vehicle and reduces vibrations transmitted to the passengers or the load. The installation of the floor according to the invention is simple, as will be explained later in the description.

BRIEF DESCRIPTION OF THE DRAWING

The subject of the invention is shown in the embodiment in the drawing, in which.

DETAILED DESCRIPTION OF THE PREFERRED EMBODIMENTS

Figure 1:
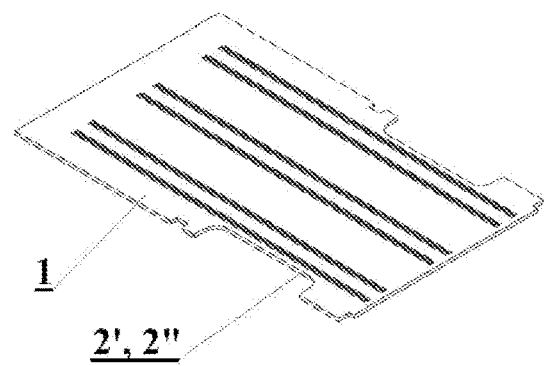
FIG. 1 shows a perspective view of the overlay floor.
Figure 2:
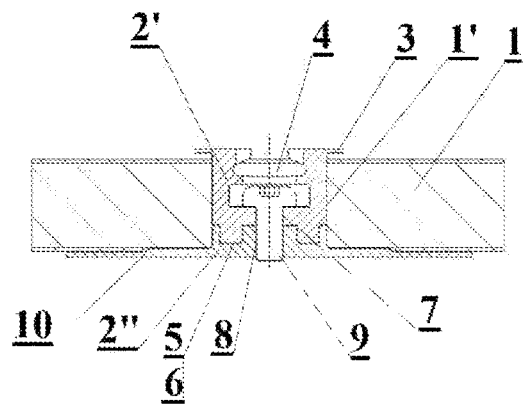
FIG. 2 shows a cross-section of the overlay floor.
Figure 3:
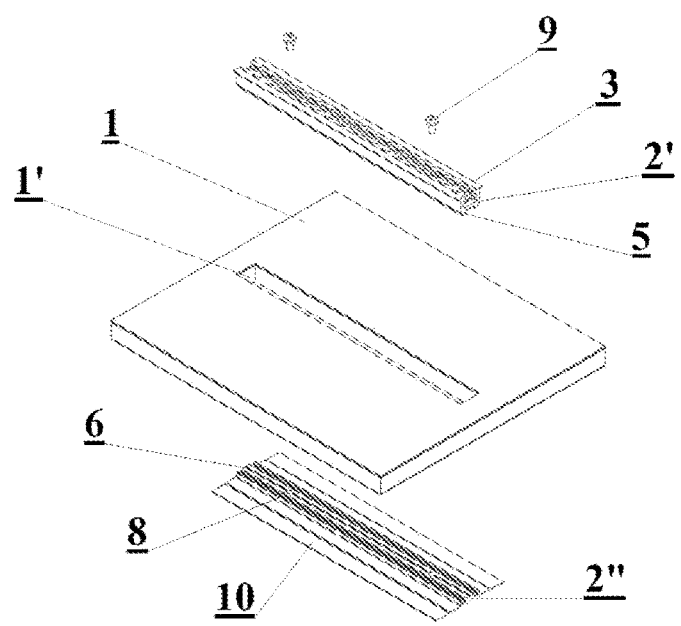
FIG. 3 shows the floor components ready for mounting.

As shown in FIG. 1, the overlay floor has a shape adapted to the mother floor of the vehicle in which it is to be mounted. As shown in FIG. 2 and FIG. 3, in the floor plate 1, in this embodiment being a layered plate, consisting of three layers glued together, longitudinal mounting sockets 1' are made into which two-part mounting rails are inserted. The mounting rails consist of an upper rail 2 with flanges 3 and a groove 4 for equipment fasteners and a 2" lower base connected to it. The mounting sockets 1' are made in a uniform sheet of the floor plate 1 as through, longitudinal holes for the profiles of both parts of the mounting rails. The upper rails 2' have a longitudinal lock 5 at the bottom for connection to the lower bases 2" which have a corresponding longitudinal lock 6 along the upper surfaces of the bases 2". The width of the profile of the upper rails 2' and the width of the base profile 2" are such that they fit in the mounting sockets 1' with a light interference. The width of the foot 10 of the lower base 2" is many times greater than the width of the mounting sockets 1". The upper rail 2' with a shaped groove 4 at the top is used to attach the fasteners of the equipment, i.e. the screws for the seats, additional equipment such as a bed in camper van, wheelchairs in the case of cars for transporting disabled people. Both parts of the mounting rails are connected to each other in a different way, most often they are screwed with screws 9, which are inserted into holes 7 in the upper rail 2" and screwed into the threads of holes 8 in the lower base 2". In another version, the surfaces of the locks 5 and 6 are covered with a layer of glue, or a bolted joint with screws 9 and a glue joint are used. The profiles of the upper 2' rails and the lower 2" base are pressed into the sockets 1' with a light interference, and additionally it is possible to cover the contact surfaces of the upper 2' rails profiles and 2" lower base profiles and the walls of the 1' mounting sockets with a layer of a glue so the sides of the mounting rails fit tightly to the side walls of the mounting sockets 1', which makes the overlay floor stiff and durable. The installation of the floor in the vehicle is simple and results from the construction of the overlay floor. It can be realized in various ways, eg: 2" lower bases are first arranged according to the design and glued to the vehicle's mother floor. Then, the plate 1 is placed on the profiles of the lower bases 2" with the mounting sockets 1', and the upper rails 2" are inserted into the mounting sockets 1', and they are fixed with screws 9 to the lower bases 2". In the glued version, the joined surfaces of the locks 5 and 6 are covered with a layer of glue, and the surfaces of the mounting sockets 1" are also covered with the layer of glue, while it is possible to combine both ways of joining parts of the mounting rails—screwing with screws 9 and gluing. Another method of mounting is to prepare a complete overlay floor outside the vehicle and fix the whole to the vehicle mother floor. Then insert the bottom plates 1 from the bottom of the 2" bases (they can be joined with a layer of glue), then the upper rails 2' are placed from the top (also by adding glue to the surface of the mounting sockets 1' and to the locks 5 and 6) and screwed together both parts of the mounting rails. The mounting rails clamp the plate 1 on both sides, they jam on it. Such a floor is stiff, light and durable, it is easy to mount and its use is manifold. An overlay floor according to the invention is attached to the mother floor of the vehicle by gluing or screwing, using appropriate reinforcement pads if necessary.

The invention claimed is:

1. An overlay floor for motor vehicles, intended to be mounted to a mother floor of a vehicle, comprising:
    longitudinal mounting sockets in a base plate,
    with mounting rails pressed into the mounting sockets for fixing seat fasteners or other equipment, wherein the mounting rails have
    longitudinal flanges protruding along a length of the base plate, along entire length beyond an outline of the mounting sockets in the base plate, wherein between the flanges there is
    a longitudinal shaped groove for fasteners of a vehicle equipment made in a form of a uniform plate for laying on the mother floor of modes of transport, reflecting a shape of the mother floor, wherein the mounting rails have wide bases for laying at a bottom of the vehicle mother floor, wherein
    a support plate is laid on an upper surfaces of the wide bases, wherein the mounting rails comprises:
    an upper rail (2')
    with flanges (3) and
    a groove (4) for vehicle equipment fasteners and connected to the upper rail (2')
    a lower base (2"), with
    the mounting sockets (1') in an overlay floor plate in
    a floor plate (1) are made as going through, longitudinal holes for profiles of the mounting rails, and a width of the profile of the upper rails (2') and the width of the profile of the lower base (2") are such that they fit in the mounting sockets (1') with a light interference, and a width of a foot (10) of the lower base (2") is greater than a width of the mounting sockets (1').

2. The overlay floor according to claim 1, wherein the upper rails (2') have a bottom longitudinal lock (5) for connecting to lower bases (2") which have a corresponding longitudinal lock (6) along upper surfaces of the lower bases (2").

3. The overlay floor according to claim 1, wherein the upper rails (2') and the lower bases (2") are connected to each other by screws (9), where in a center of the upper rails (2') there are bolt holes (7) for screws (9) and in a center of the profiles on the lower bases (2") there are threaded holes (8) for threads of the screws (9) connecting two parts of the mounting rails at their locations corresponding to the holes (7) in the upper rails (2').

4. The overlay floor according to claim 1, wherein a lock (5) of the upper rails (2') and a lock (6) of the lower base (2") are joined by a layer of glue.

5. The overlay floor according to claim 1, wherein the upper rails (2') and the lower bases (2") are connected to each other by screws (9), wherein in a center of the upper rails (2') are holes (7) for the screws (9) and in a center of the profiles of the lower bases (2") in a places corresponding to the holes (7) in the upper rails (2') there are threaded holes (8) for a thread of the screws (9) connecting both parts of the mounting rails and a lock (5) of the upper rails (2') and a lock (6) of the lower base (2") are joined together with a layer of glue.

6. The overlay floor according to claim 1, wherein profiles of the upper rails (2') are jointed to the mounting sockets (1') by a layer of glue and/or profiles of the lower bases (2") are joined to the mounting sockets (1') by a layer of glue.

\* \* \* \* \*